(12) United States Patent  (10) Patent No.: US 7,954,711 B2
Adstedt et al.  (45) Date of Patent: Jun. 7, 2011

(54) SYSTEM AND METHOD FOR DEMAND DRIVEN COLLABORATIVE PROCUREMENT, LOGISTICS, AND AUTHENTICITY ESTABLISHMENT OF LUXURY COMMODITIES USING VIRTUAL INVENTORIES

(75) Inventors: Kjell Roland Adstedt, Scottsdale, AZ (US); Joakim Alexander Sternberg, Edina, MN (US)

(73) Assignee: Left Bank Ventures LLCDE (US)

( * ) Notice: Subject to any disclaimer, the term of this patent is extended or adjusted under 35 U.S.C. 154(b) by 932 days.

(21) Appl. No.: 11/837,465

(22) Filed: Aug. 10, 2007

(65) Prior Publication Data

US 2008/0217404 A1  Sep. 11, 2008

Related U.S. Application Data

(60) Provisional application No. 60/852,918, filed on Oct. 18, 2006, provisional application No. 60/904,941, filed on Mar. 5, 2007.

(51) Int. Cl.
G06K 15/00 (2006.01)
(52) U.S. Cl. ................................ 235/385; 235/383
(58) Field of Classification Search ................ 235/375, 235/383, 381, 385, 492, 486, 487; 705/37
See application file for complete search history.

(56) References Cited

U.S. PATENT DOCUMENTS

| 6,137,413 | A | 10/2000 | Ryan, Jr. |
| 6,226,619 | B1 | 5/2001 | Halperin et al. |
| 6,360,208 | B1 | 3/2002 | Ohanian et al. |
| 6,641,052 | B2 | 11/2003 | Baillod |
| 6,828,941 | B2 | 12/2004 | King et al. |
| 6,891,474 | B1 | 5/2005 | Fletcher |
| 6,952,157 | B1 * | 10/2005 | Stewart et al. ............... 340/10.2 |
| 7,017,807 | B2 | 3/2006 | Kipp |
| 7,025,263 | B2 | 4/2006 | Kocott |
| 7,034,689 | B2 | 4/2006 | Teplitxky et al. |
| 7,040,532 | B1 | 5/2006 | Taylor |
| 7,048,179 | B2 | 5/2006 | Claessens |
| 7,061,382 | B2 | 6/2006 | Claessens et al. |
| 7,126,479 | B2 | 10/2006 | Claessens |
| 7,374,102 | B2 * | 5/2008 | Arnold et al. ................. 235/492 |
| 2002/0178107 | A1 * | 11/2002 | Biancavilla ..................... 705/37 |

(Continued)

FOREIGN PATENT DOCUMENTS

JP  2006-194947  7/2006

(Continued)

OTHER PUBLICATIONS

Non-Final Office Action mailed Jan. 5, 2010, U.S. Appl. No. 11/837,462.

(Continued)

Primary Examiner — Thien M Le
(74) Attorney, Agent, or Firm — Marlan D. Walker; Luce, Forward, Hamilton & Scripps, LLP

(57) ABSTRACT

Systems and methods providing for a virtual inventory system of goods aggregating disparate inventories into a single virtual inventory for the purpose of tracking the goods, trading the goods, and establishing authenticity of the goods. The aggregation of disparate inventories readily provides for quick procurement or sales of the goods, especially as they relate to high end, rare, or expensive items. Accordingly, electronic product codes are assigned to each good to monitor inventory and movement of the good.

19 Claims, 8 Drawing Sheets

U.S. PATENT DOCUMENTS

| | | |
|---|---|---|
| 2004/0148117 A1 | 7/2004 | Kirshenbaum et al. |
| 2005/0003839 A1 | 1/2005 | Tripp |
| 2005/0102189 A1 | 5/2005 | Lopez et al. |
| 2005/0144132 A1 | 6/2005 | Lin |
| 2005/0187827 A1 | 8/2005 | Weiss et al. |
| 2005/0248455 A1 | 11/2005 | Pope |
| 2005/0261963 A1 | 11/2005 | McLaughlin |
| 2006/0017571 A1* | 1/2006 | Arnold et al. .............. 340/572.7 |
| 2006/0095343 A1 | 5/2006 | Clarke et al. |
| 2006/0113369 A1 | 6/2006 | Taylor |
| 2006/0113370 A1 | 6/2006 | Taylor et al. |
| 2006/0120752 A1 | 6/2006 | McVicker et al. |
| 2006/0132311 A1 | 6/2006 | Kruest |
| 2006/0261950 A1 | 11/2006 | Arneson et al. |
| 2006/0290496 A1 | 12/2006 | Peeters |
| 2007/0008121 A1 | 1/2007 | Hart |
| 2007/0050370 A1* | 3/2007 | Denny ........................... 707/10 |
| 2007/0055576 A1 | 3/2007 | Wayman |
| 2007/0069895 A1 | 3/2007 | Koh |
| 2007/0118436 A1 | 5/2007 | McDowell et al. |
| 2007/0130090 A1 | 6/2007 | Staib et al. |
| 2007/0150369 A1 | 6/2007 | Zivin |
| 2007/0187266 A1 | 8/2007 | Porter et al. |
| 2007/0299743 A1 | 12/2007 | Staib et al. |

FOREIGN PATENT DOCUMENTS

| | | |
|---|---|---|
| KR | 20-0252202 | 10/2001 |

OTHER PUBLICATIONS

Final Office Action mailed Sep. 2, 2010, U.S. Appl. No. 11/837,462.

* cited by examiner

SYSTEM AND METHOD FOR DEMAND DRIVEN COLLABORATIVE PROCUREMENT, LOGISTICS, AND AUTHENTICITY ESTABLISHMENT OF LUXURY COMMODITIES USING VIRTUAL INVENTORIES

RELATED APPLICATIONS

This application claims the Paris Convention Priority of U.S. Provisional Application No. 60/852,918, entitled "System and Method for Demand Driven Collaborative Procurement, and Logistics of Luxury Commodities Using a Plurality of Virtual Inventories" filed on 18 Oct. 2006, and Provisional Application No. 60/904,941, entitled "System and Method for Establishing Provenance and Authenticity of Fine and Rare Wines" filed on 5 Mar. 2007.

BACKGROUND

The present disclosure is related to systems and methods for maintaining inventories of luxury items, such as wines, as well as for determination of global provenance and stewardship of such items.

SUMMARY

Systems and methods providing for a virtual inventory system of goods aggregating disparate inventories into a single virtual inventory for the purpose of tracking the goods, trading the goods, and establishing authenticity of the goods. The aggregation of disparate inventories readily provides for quick procurement or sales of the goods, especially as they relate to high end, rare, or expensive items. Accordingly, electronic product codes are assigned to each good to monitor inventory and movement of the good.

According to a feature of the present disclosure, a system is disclosed comprising a plurality of items, each item being associated with a unique electronic product code, a plurality of electronic product code readers disposed in a plurality of disparate locations, and a virtual inventory to maintain inventory information of a plurality disparate collections of items connected to each of the plurality of electronic product code readers. At least one electronic code reader monitors each disparate collection.

According to a feature of the present disclosure, a method is disclosed comprising offering a virtual inventory to maintain inventory information of a plurality disparate collections of items, connecting the virtual inventory to at least one electronic product code reader that monitors the inventory of one of the disparate collections of items, each item having a unique electronic product code implement affixed, and maintaining information regarding the inventory of the disparate collection of items, wherein the virtual inventory periodically collects inventory data from each electronic product code reader to which it is connected. The electronic product code implement is rendered inoperable when each item is used.

According to a feature of the present disclosure, a machine readable medium having instructions stored thereon for performing the steps is disclosed comprising offering a virtual inventory to maintain inventory information of a plurality disparate collections of items, connecting the virtual inventory to at least one electronic product code reader that monitors the inventory of a disparate collection of items, each item having a unique electronic product code implement affixed, and maintaining information regarding the inventory of the disparate collection of items, wherein the virtual inventory periodically collects inventory data from each electronic product code reader to which it is connected. The electronic product code implement is rendered inoperable when each item is used.

According to a feature of the present disclosure, a method is disclosed comprising using an RFID tag affixed to a plurality of items in a location in an inventory to determine to locality of the item, wherein a system of RFID antennas disposed in a location for storing the plurality of items is used to determine the locality of the item, and displaying the locality to a party.

According to a feature of the present disclosure, products by the processes disclosed above are also disclosed.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the following detailed description of embodiments of the invention, reference is made to the accompanying drawings in which like references indicate similar elements and in which is shown by way of illustration specific embodiments in which the invention, may be practiced. These, embodiments are described in sufficient detail to enable those skilled in the art to practice the invention, and it is to be understood that other embodiments may be utilized and that logical, mechanical, biological, electrical, functional, and other changes may be made without departing from the scope of the present invention. The following detailed description is, therefore, not to be taken in a limiting sense, and the scope of the present invention is defined only by the appended claims. As used in, the present disclosure, the term "or" shall be understood to be defined as a logical disjunction and shall not indicate an exclusive disjunction unless expressly indicated as such or notated as "xor."

The trade of rare wines is used herein to illustrate the principles of use of a virtual inventory system and provenance catalogue. Artisans, however, will readily recognize that the principles are adaptable for nearly any commodity, especially rare, unique, or expensive commodities subject to counterfeiting.

Additionally, the terms "customer," "consumer," "purchaser," "buyer," "supplier," and "user" each denote users of the system and are used interchangeably and generally denote entities using the systems and methods of the present disclosure in various capacities.

As used herein, the term "tool" refers to a combination of a storage device and the devices or machine readable mediums having instruction thereon for accessing, retrieving, and storing data on the storage device. Such tools may, include databases, for example SQL or Oracle databases, disk drives, and other similar device capable of storing, organizing, retrieving, and correlating data.

Figure 1:
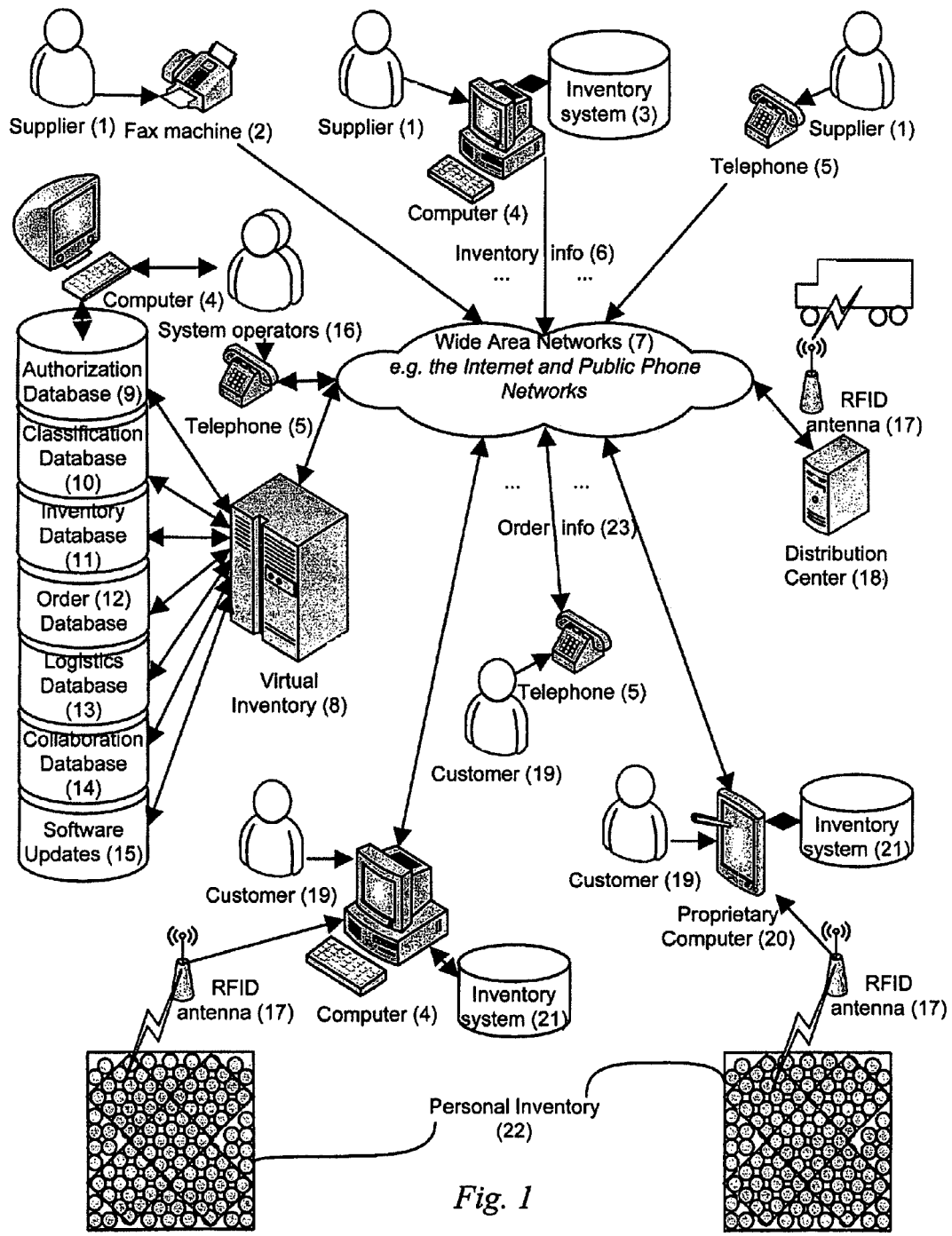
FIG. 1 is a block diagram of an embodiment of the components of a system of the present disclosure.

According to embodiments and as illustrated in FIG. 1, the components of the collaborative procurement and logistics system use a plurality of virtual inventories. These inventories may comprise any tradable commodities, including rare, unique, and expensive commodities. Suppliers 1 provide inventory information 6 by using various communication channels. Inventory information may comprise, according to embodiments, the label of a wine, its vintage, the quantity, and price information.

The communications channel may, according to embodiments, be fax machines 2, telephones 5, computer connection 7 via the internet or email, for instance connected computer 4 hosting inventory system 3. Inventory information 6, which may originate from all around the world according to embodiments, are received either directly or by fax, email, remote connection, or by other methods used for communication of inventory information and prices 6 to virtual inventory system 8. According to embodiments, inventory information 6 may be communicated to virtual inventory system 8 via phone 5 to system operator 16 who can manually enter the information into computer terminal 4 connected to virtual inventory system 8. Any supplier sending their inventory information directly to the system will first be validated against authorization database 9 used to authorize access by customers 19.

After validation, the items in inventory information 6 will be matched against classification database 10 to find the standardized (canonical) name of the item so it can be compared to other suppliers offers of the same item having a slightly different spelling or alias. Virtual inventory 8 only uses the canonical names any recognized alias or misspelling will be replaced.

Unfamiliar item names will be stored in an exception list for manual processing, according to embodiments. Thus, the classification names can be constantly updated as new canonical item names, aliases, or misspellings are discovered. The analyst processing the exception list uses reference literature for each domain to find the correct classification to use for unknown items. After the classification process has been completed the inventory info is stored in the inventory database 11, which is the essence of the virtual inventory system containing inventory, price, and other information for commodities from a plurality of suppliers from all around the world, according to embodiments.

The information in virtual inventory 8 publishes the current price and available quantities for each of item in classification database 10. According to embodiments, the quantity is calculated as the sum of the accumulated quantity among all suppliers for each specific item in classification database 10. The price may vary depending on where the customer is willing to take possession of purchased items. According to embodiments, the price is further calculated by adding a markup based on the price level of the item (for example, based on a variable percentage of the cost—the higher the cost of the item, the lower the markup percentage). According to embodiments, shipping costs, taxes, and customs duties are also added the to calculated price based on the location of the supplier and customer, which results in variable prices depending on the location of the buyer and the seller. According to embodiments, sellers may decline to sell to one or more locations. Those items will not be shown for sale to a purchaser in one of the locations.

According to embodiments, instead of publishing one sale price for items on a supplier by supplier basis, the median item sale price based on quantity levels is used as the published price for each location. According to embodiments, the price may be calculated as the median price after removing the lowest and highest offers. The lowest and highest offers may comprise a specific number of offers removed, or a specific number of offers removed based on the number of offers for a given item (e.g., the 1 highest and 1 lowest offer is removed if there are 20 or less offers, the 3 highest and 3 lowest are removed if there are 21-50 offers, and so forth), or a set percentage of the lowest and highest offers may be removed.

For example, assume there are 36 different offers for the same wine. 20% of 36 offers is 7.2 offers. Depending on whether the algorithm rounds up or down, either 7 or 8 of both the highest and lowest offers for the wine are removed from the set of 36 offers for the wine and the median of the resulting set is calculated to be the price. Thus, after the lowest 7 offers for the wine are removed and the highest 8 offers for the wine are removed, a set of 22 offers for the wine remains. If 24 of the offers for the wine priced the wine at $100.00, 6 of the offers priced the wine at $95.00, and 6 of the offers priced the wine at $80.00, the resulting price offered by the virtual inventory system would be $100.00 (the median of the remaining set of 22 wines).

According to other embodiments, an average price may be used. Artisans will appreciate the variations in pricing strategy that both keep margins acceptable and also make the systems and methods of the present disclosure attractive to consumers. In the above example, the price would be set to the average of the remaining 22 wines, or $98.86.

All prices are converted to one uniform currency and stored in virtual inventory 8. These prices may be converted to a local currency based on a then current exchange rate depending on the location of the purchaser. According to embodiments, prices will change daily based on at least one of new incoming offers, items that are purchased, and existing offers expiring. Similarly according to embodiments, prices may be updated in real time or based on the probability that the current quantity or price is no longer accurate. The final price may vary depending on applicable discounts for a specific customer (e.g. based on pre-payment, repeat orders, large quantities, etc.).

The published quantities and prices can be used both by internal sales staff receiving orders over the phone from customers 19 calling in orders or by customers 19 submitting orders 23 directly connecting to the virtual inventory system from computer 4 or from portable computer 20 designed specifically for use with the virtual inventory system, according to embodiments. According to other embodiments, nearly any computing system that can communicate with a network and interface with the virtual inventory system may be implemented for use with the present disclosure. Use of a proprietary computer provides simplicity to customers who want to have a turn-key solution for procuring luxury commodities or managing the commodities once obtained.

According to embodiments, only the published sale price is available to customers. However, the virtual inventory system internally determines the individual cost provided by each supplier and decides how to source orders based on price, location, or other factors. According to embodiments, an internal function finds offers that are substantially lower than the calculated median cost, thus enabling the virtual inventory system to proactively offer these "special deals" to customers that might be interested in a particular item at less than the calculated median price.

According to related embodiments, the virtual inventory system provides a function available both to internal sales and external customers is a collections simulator which can suggest a complex order based on a plurality of items from the virtual inventory given the total order amount the customer is willing to spend and the customer's particular needs, preferences, and individual ratios, e.g. if the good is a wine the ratios may comprise type of wine (red/white/rose/etc.), wine region, maturity (at peak now/with 5 years/etc.), ratings, value, etc. According to embodiments, the customer may indicate a collection strategy that the collections simulator suggests wines for based on the customer's current inventories and the inventory available for purchase store in virtual inventory 8. According to similar embodiments, a customer may indicate needs for a particular purchase, for example for an upcoming event, and the collections simulator will make suggestions accordingly.

Customers who connect directly to virtual inventory 8 will first be authenticated against the authorization database 9, before they can browse or search the inventory database 11, according to embodiments.

According to embodiments, virtual inventory software 21 my be provided or a customer may use a portable computer 20 designed specifically for use with the virtual inventory system having inventory system software 21 preinstalled and configured to monitor and track their personal inventories 22 and communicate with virtual inventory 8. Also if using the proprietary customer inventory software 21, the virtual inventory checks for any applicable, software updates 15, which will automatically be downloaded and installed.

According to embodiments, placed orders are stored in order database 12, which also manages payment transactions that comprise, based on the customers credit history and financial status, a combination of credit card payments, bank-to-bank wire transfers, or invoices issued to the customer. According to embodiments, the customer may browse, search inventory, or place orders via telephone (talking to a operator), fax (order entry done manually), computer network, such as the internet or cell phone network, periodic mailed inventory literature, or a proprietary application specifically made for use with the virtual inventory system running on either a regular or proprietary computer.

At a predetermined time period, for example at the end of each day or every hour, the virtual inventory system optimizes matches between suppliers and placed orders to optimally fulfill all the new orders. Optimization criteria includes, according to embodiments, using as few suppliers as possible while keeping the margins acceptable, but also taking into account the internal ranking of the suppliers based on previous history. In other words, the lowest offer might be skipped in favor for a higher offer because that supplier either has a better ranking or can source a larger part of the total order. Additional sourcing options may be used in the event that an order quantity is greater than the primary sourcing option has available or the primary sourcing option is out of stock. After virtual inventory 8 defines which suppliers to source from, it will add the new order to logistics database 13.

New orders are processed by the purchasing staff that contacts the suppliers to try to fulfill the orders, according to embodiments. According to alternate embodiments, virtual inventory queries both commercial sellers, as well as individual collectors, and automatically sends the terms of a proposed sale for a given item to the potential supplier. If any of the chosen suppliers are out of stock or unwilling to sell, the next most optimal supplier will be used instead and so forth. Once orders have been placed with each supplier, ordered items will first be shipped to nearest distribution center 18 where incoming deliveries from suppliers will be processed for eventual compliance and then staged for delivery to the purchaser. During this staging process and according to embodiments, a unique RFID tag is added to each individual item being shipped, if the item currently has not already been labeled with an RFID tag. The distribution centers uses RFID antennas 17 to keep track of stored items and to facilitate shipping. Logistics database 13 keeps track of the status of each order and is updated with information regarding the progress of each, order as the status periodically changes from order placed, order approved, order shipped from supplier, order received at a distribution centers order shipped from distribution center, order received by purchaser, order payment received, etc.

Customers 19 receiving their placed orders have the option to use proprietary inventory software 21 to organize and manage inventory of items in their personal inventory 22. According to embodiments, they can be provided with RFID antenna 17 that inventories items in their personal inventory 22 that are RFID tagged and manages the personal inventory 22 with inventory system 21. This will enable inventory system 21 to automatically keep track of the items owned by customer 19. Alternatively according to embodiments, customers 19 chose not to use inventory system 21 or RFID antenna 17. Rather, customer 19 orders and manages the inventory manually, for example with phone 5 and a coordinate system, for example.

However, according to embodiments, proprietary computer 20 or computer 4 running proprietary inventory system 21 software uses RFID antenna 17 to provide a system that will act as a fully automated procurement, inventory management, and concierge system for their personal inventory 22. According to embodiments, customer 19 using proprietary computer 20 may use touch screens devices located in the same area as personal inventory 22 or other touch screen/input mechanisms located in more convenient locations to access virtual inventory 8 and manage their personal inventory 22.

For example, customer 19 may receive a delivery of wine and place the wine on racks within his wine cellar. While in the cellar, customer 19 may access proprietary computer 19 and have personal inventory 22 updated with the wine's data and the approximate location in the cellar for easy retrieval. When customer 19 decides to sell a wine, the touch screen in the more convenient location may be accessed to accomplish the sale of the wine and locate it prior to going to the cellar to retrieve it for shipment.

According to embodiments, the concierge system, which also may be utilized from a internet application, helps the customer with collection strategy advice, menu planning advice, tasting/sampling advice, etc., using either existing items in the collection or by suggesting new items to procure depending on a set of criteria provided. Additionally, cost analysis may be provided by comparing price paid with historical and current price points in virtual inventory 8, auctions, and wholesale/retail markets.

The collaborative aspect of the virtual inventory system provides a number of useful features, according to embodiments. Customers use a web site, a proprietary computer, or proprietary software to provide feedback in the form of comments and reviews about items, as well as expected "best consumed by" timeframes, for example. Feedback may also be provided on the provenance and condition of shipped items to allow for better ranking of suppliers, which is used both for making purchasing decisions and decisions on when to consume specific items in the customer's inventory. Additionally, automatic alerts are configurable to show up on the customer's computer, be emailed, or sent as a cell phone message whenever certain items are offered below a given price point, receives a good/bad review, or is deemed as near or past its best consumed by timeframe.

According to embodiments, customers may offer items from their personal inventory for sale to other customers either at the current sale price in the virtual inventory or at a price of their own choice. Similarly customers can create lists of items that they wish to procure either at the current sale price or at another desired price. The information provided by the customer and the suppliers is used to automatically find possible sales between customers or suppliers. Such transactions are handled anonymously by the virtual inventory system. The virtual inventory system acts as a trusted middleman between the supplier and the purchaser. If a supplier's offer matches items desired by a customer, it will be managed as a regular order by the virtual inventory system.

If the match is between two customers, the items are picked up, shipped, and delivered by a third party, according to embodiments. The payment transaction is managed by the virtual inventory system, according to embodiments. Only items earlier procured through the virtual inventory system are eligible for of customer to customer trades to guarantee the quality and provenance of the items, according to embodiments. According to alternate embodiments, if a customer may use a service provided by the virtual inventory staff to certify and add an RFID tag to existing items procured outside of the virtual inventory system. Items will be certified and RFID tagged only if the customer can prove acceptable provenance and storage conditions of the item procured. According to embodiments, the identities of the supplier or customer may be held confidential.

Figure 2:
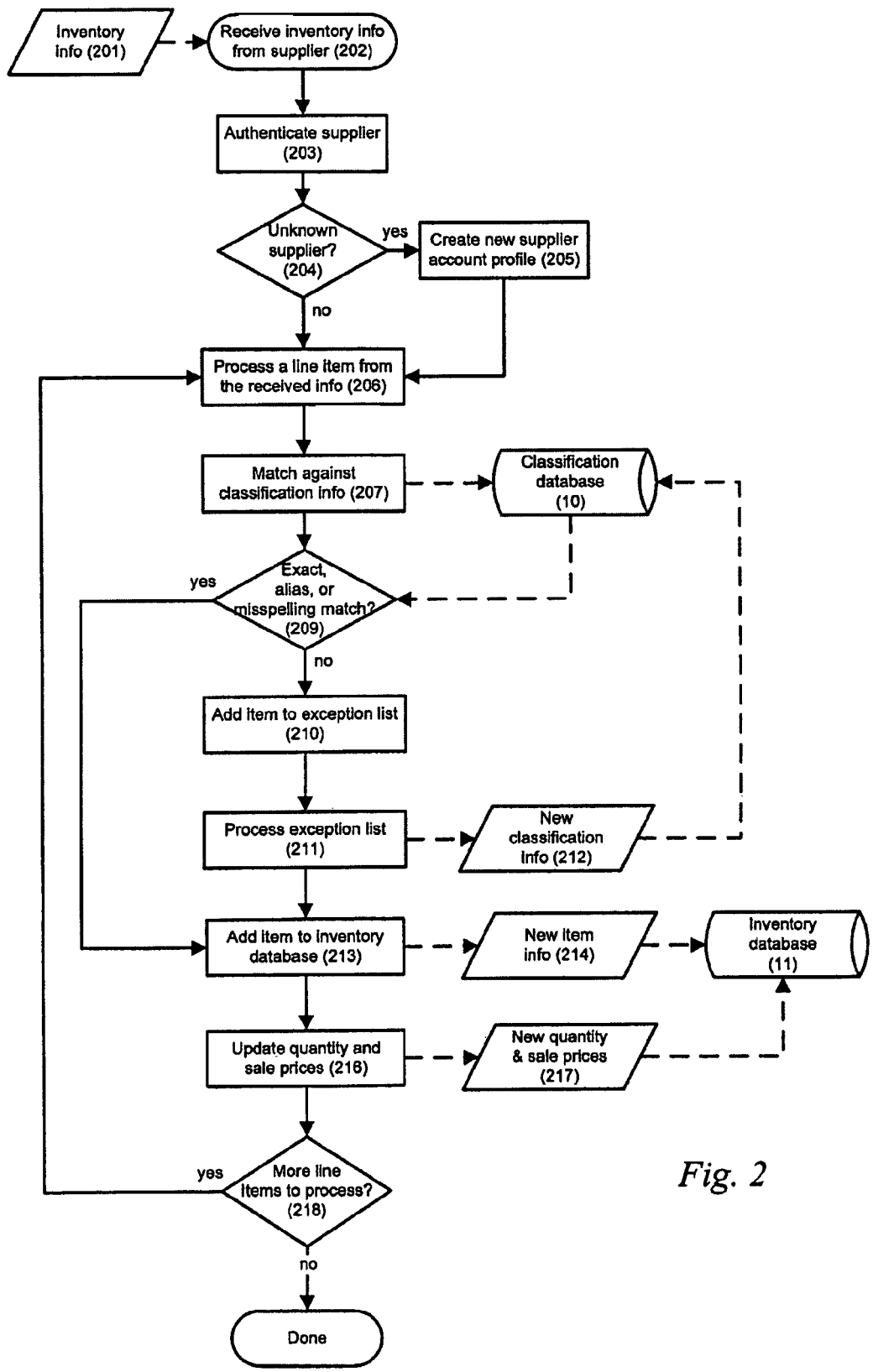
FIG. 2 is a flowchart of an embodiment of a virtual inventory process.

According to embodiments and as illustrated in FIG. 2, the virtual inventory process is disclosed. Suppliers uses a communication channel of their choice (e.g., fax, phone, email, or computer) to send inventory information 201 to the virtual inventory system. The virtual inventory system processes incoming inventory information 202 from the supplier. First the system authenticates the identity of the supplier providing the information in operation 203. In cases where the supplier uses a fax or phone, an operator performs the authentication by using a computer terminal connected to the system and orally authenticates the supplier.

If the supplier is previously unknown in operation 204, the operator creates a new account profile for the supplier in the system in operation 205. After authentication, the system processes the supplied inventory information in operation 206.

Items may be inventoried One at a time or as a batch after each item is input, according to embodiments. In both cases, each item typically consists of a description of the item for sale together with the offered price and available quantity. According to embodiments, the system manages currency conversion automatically as the items may originate in different countries than where they are purchased. According to embodiments, each supplier's account profile contains information detailing the typical formats used by the supplier to present its offers, which is used by the process that extracts each line item in operation 206. Each extracted line item description is matched 207 against a classification database 10 by first looking for an exact match against a list of item aliases that also include the standardized (canonical) item names. According to embodiments, if an exact match is not found in operation 209, another search is made against the same list, this time allowing for variances in spelling. If only one match is found when searching for alternate spelling, that match will be used as the found item in operation 209 and the alternate spelling added to the alias list.

If no match can be found or if more then one match is found, the item is added to an exception list in operation 210. This list is manually processed by an analyst in operation 211 that will use reference literature for each domain to find the correct classification to use for unknown items or to pick the correct item when more than one match is found. The new classification information 212 gathered during the exception analysis is then added back to the alias list.

According to embodiments, after a match is found for the inventory item, the inventory information 214 is added to the inventory database 11 using the matched canonical item name. Consequently, the inventory from multiple suppliers reference the same canonical item, which makes possible the systematic comparison of offers from different suppliers according to the methods disclosed herein. After each new inventory item is added, the quantity available and sale price 217 for each particular item is updated in operation 216 in inventory database 11. As previously disclosed, the sale price differs depending on where the customer wishes to take possession. According to embodiments, the sale price is deduced on a per customer basis by adding a markup based on the general price level of the item (e.g., based on a variable percentage of the cost—the higher the cost, the lower the markup percentage), the shipping costs, handling costs, and taxes and duties. Shipping, taxes, and duties, according to embodiments, are added based on the location of both the supplier and purchaser. Thus, according to embodiments, the price changes on a location by location basis and differs from country to country, state to state, and in some instances county to county or city to city.

According to alternate embodiments, a calculated sales price may be averaged or based on a median value for a set of offers, and purchasers provided with the average or median price. Thus, one sale price is published for each supplier's offer, which is average or median item sale price based on quantity levels after removing the lowest and highest offers, according to embodiments. The resultant price will be used as the published sale price on a location by location basis. For example, the virtual inventory system may compute the average or median prices on a per country basis. A purchaser in the United Kingdom would see a sales price in British Pounds after the applicable duties, taxes, and shipping costs are computed on a per item basis from the origin to the United Kingdom. The sales prices are maintained in the inventory database as a standard currency, but converted to the local currency of the purchaser as the purchaser uses the system and based on then current currency conversion values.

After an item is priced in operation 216, the system determines if additional items remain to be classified and priced in operation 218. If so, the next item is processed in operation 206.

Figure 3:
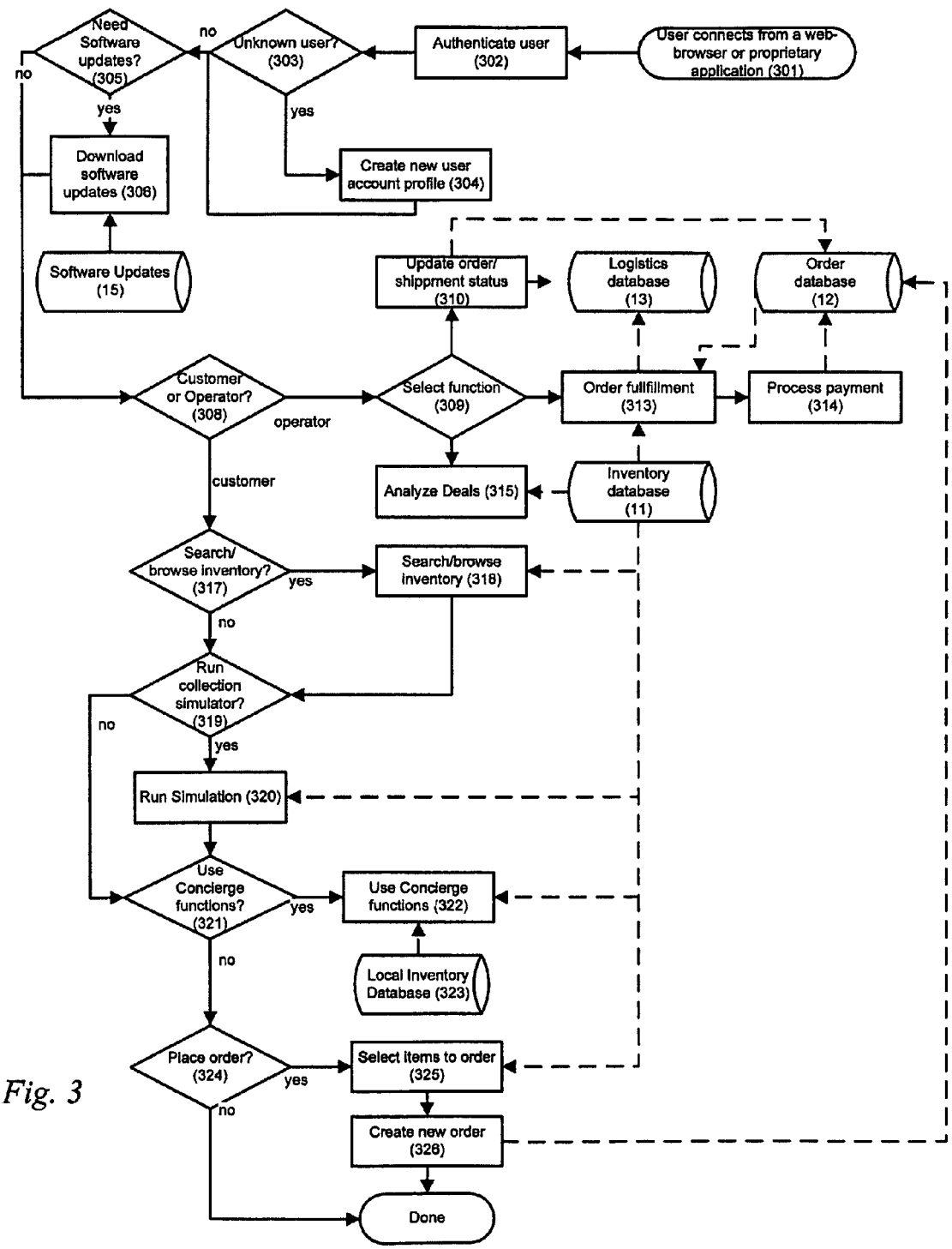
FIG. 3 is a flowchart of an embodiment of a procurement and logistics process.

According to embodiments and as illustrated in FIG. 3, a procurement and logistics process is disclosed. Users connect to the inventory system as disclosed herein, for example by using a web browser, a proprietary computer, or using a computer running a proprietary software application in operation 301. The system verifies the identity of the user in operation 302. If the user is determined to be unknown in operation 303, the system prompts the user to create a new account profile in operation 304. According to embodiments, the software will then automatically update itself. Accordingly, the system will determine if software updates are available in operation 305. If so, software updates 15 are downloaded and installed in operation 396. According to embodiments, software updates 15 may update the proprietary software by providing updated software files, a proprietary computer by flashing the computer's ROM, or by updating the web-based plugin software, or in other similar ways that are well known and understood in the art. According to embodiments users that log in via a web-based interface, server-side software is all that must be updated and is performed on the server-side.

According to embodiments, users have varying access to the features of the system depending on their role as determined in operation 308. Operators, who access the system as a proxy for an actual purchaser or access functions unavailable to purchasers in behalf of the purchasers, choose from the following functions 309, according to embodiments: update order or shipment status in operation 310, order fulfillment in operation 313, or deal analysis in operation 315. The update order or shipment status operation 310 allows the operator to view or change status on an order placed by a customer. It also allows the operator to view or change that status of a shipment of an order that is in progress. According to embodiments, when the inventory system is used in a distribution center-type environment, the update shipment status function is activated automatically by an RFID antenna that identifies incoming and outgoing items. Updated orders or shipments are saved to logistics database 13 or order database 12.

The order fulfillment operation 313 allows the operator to match placed orders in order database 12 against suppliers' offers in the inventory database 11. At the end of each day order fulfillment uses a method that optimizes the match between offers from suppliers and placed orders to fulfill all the new orders, as disclosed previously. According to embodiments, the optimization is based on using as few suppliers as possible while keeping the margins acceptable and also taking into account the internal ranking of the suppliers based on prior history. Thus, the lowest offer might be skipped in favor of a higher offer because the supplier has a better ranking or can source a larger part of the total order. According to embodiments, other sourcing options will be determined in case the primary source cannot fulfill an order. Once the order fulfillment operation 313 has defined which suppliers to source from and the operator has confirmed availability and placed orders with the suppliers, the order is added as a new order in logistics database 13. Once payment from each customer has been processed and acknowledged in operation 314, the order in order database 12 are updated as paid and queued to be processed.

Deal analysis in operation 315, according to embodiments, finds any offer that is substantially lower than the calculated average or median cost, which enables the operator or a sales staff to proactively offer special deals to customers that might be interested in a particular item.

According to embodiments, if the connecting user is determined to be a customer in operation 308, the customer chooses from the following features: search/browse the inventory in operation 317, run the collection simulator in operation 319, use concierge functions in operation 321, or place an order in operation 324. Search/browse the inventory 318 allows customers to navigate the virtual inventory 8 in operation 316 using a classification structure or by using search criteria for the items they wish to find out more about (e.g., sale price, quantity, collaborative comments from other customers, etc.). Collection simulator 320 suggests a acquisition strategy based on a plurality of items from virtual inventory 8 based on criteria such as the total order amount the customer is willing to spend and the customer-defined preferences, such as item attributes or individual ratios.

According to embodiments, concierge system 322 help the customer with advice related to the items contained in virtual inventory 8. For example, if virtual inventory 8 comprises fine or rare wines, concierge functions advice the customer regarding collection strategies, menu planning, tasting/sampling themes, etc. Advice is made, according to embodiments, in conjunction with the existing items in customer's local inventory database 323 or by suggesting new items to procure from virtual inventory 8 that might be of interest or that are specially priced. Concierge system 322 also provides cost analysis, according to embodiments, by comparing the price paid for items with historical and current price points in virtual inventory 8, auctions, and wholesale/retail sales. Cost analyzed information helps the customer price items the customer wishes to sell or allows the customer to value their personal inventory 22 for other purposes, such as procuring insurance for personal inventory 22. Finally, customers may place orders in operation 324, where results from previous inventory browsing, searching, or new collection simulation may be selected in operation 325 and placed as new orders in operation 326, which are then added to order database 12.

Figure 4:
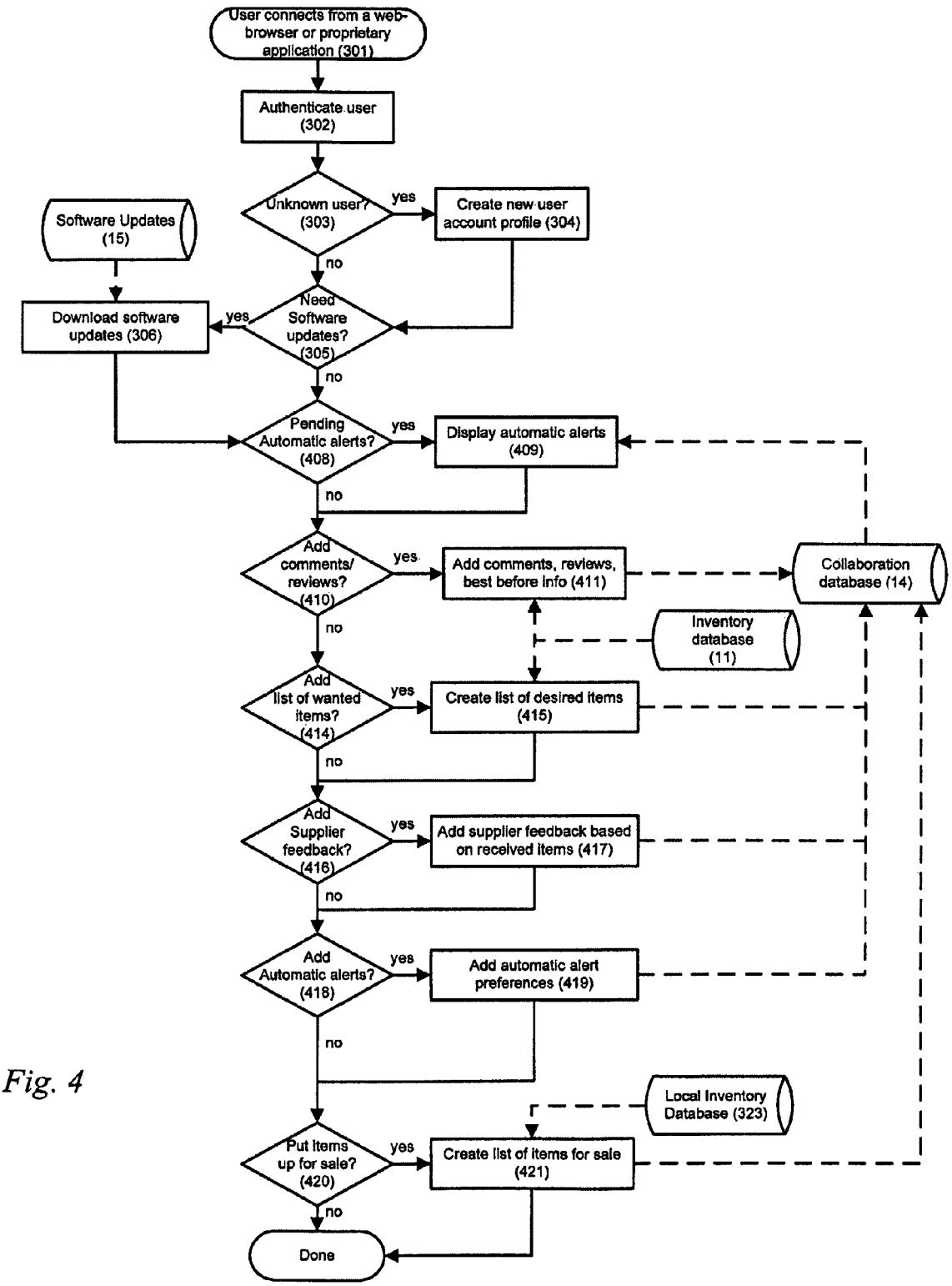
FIG. 4 is a flowchart of an embodiment of a collaboration process.

According to embodiments and as illustrated in FIG. 4, a collaboration process is disclosed. The authentication process detailed in operations 301, 302, 303, 304, and 305, as well as the software updating process in operation 306 are previously disclosed. According to embodiments, automatic alerts 409 are presented to users in operation 408 if they are available. Automatic alerts are created when certain selected items are offered below a given price point, receives a good/bad review, or the item is deemed as past or near its best consumed by timeframe, according to embodiments. Automatic alerts may also display other information either initiated automatically by the virtual inventory system or based on previously desired type alerts, for example when a rare wine become available for sale. These alerts are also configurable for transmission via secondary communications mechanisms, such as by email, as a text message to the user's cell phone, or by a tall from an operator.

After automatic alerts 409 are displayed to the user, various features are available to the user, including: adding comments, reviews, or best consumed before info in operation 410; creating a list of desired items in operation 414; adding supplier feedback to record the user's experience with a given supplier, including information regarding the condition, delivery time, and overall experience of ordered items, in operation 416; configuring of automatic alerts in operation 418; or putting up items from their own inventory for sale in operation 420. Adding comments, reviews, or best consumed before information 411 about an item is accomplished by browsing/searching inventory database 11 and selecting the function to add the comment, review, or best consumed before information 411 from a screen showing information about the particular item, which is then added to collaboration database 14.

According to embodiments, users may create a list of desired items whereby the virtual inventory system can alert the user. To create list of desired items in operation 415, the user first browses/searches inventory database 11 and then selects desired items to be added to list of desired items in operation 415, which is then stored in the collaboration database 14.

According to embodiments, adding supplier feedback is accomplished in operation 417 by adding negative or positive comments about received items to collaboration database 14. Users can access suppliers by accessing prior orders, according to embodiments.

Automatic alerts are configured in operation 419 by defining the kinds of alerts to trigger and how the user wishes to be alerted. For example, users may desired to have an alert sent when a particular item reaches a given price, point. The user is notified, according to the example, when the user next logs into their account, by email, cell phone text message, or by receiving a telephone call from an operator.

Finally putting up items for sale in operation 421 is accomplished by selecting existing items from the user's local inventory database 323 that the user wants to offer to other users. These items for sale are stored in collaboration database 14.

According to embodiments, the virtual inventory system may comprise a service based product accessible by internet browsers or internet enabled cell phones for interaction with the virtual inventory system. Moreover, as will readily be understood by artisans, the virtual inventory system may deal in many luxury commodities, such as wine, art, foods, boats, cars, homes, etc.

The present disclosure facilitates the transfer of luxury items between producers, suppliers, and consumers in various permutations. Because luxury items are both scarce and expensive, a system for establishing provenance and authenticity is useful to ensure goods are not counterfeit, as well as provide suppliers and consumers with a reasonable basis of stewardship of the luxury items. To that end, the present disclosure further discloses methods for establishing provenance and authenticity to be used in conjunction with the virtual inventory system.

Figure 5:
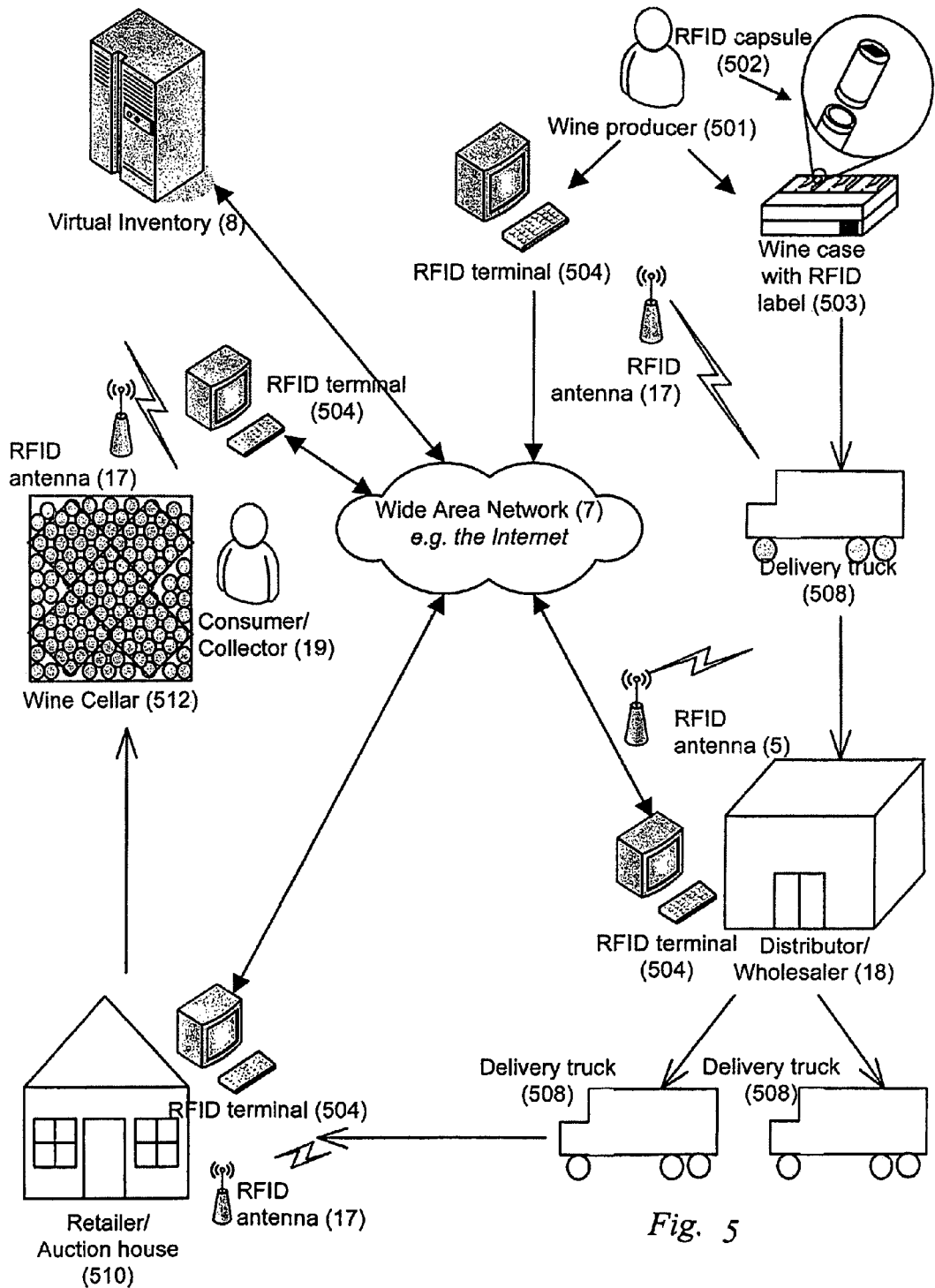
FIG. 5 is a block diagram of an embodiment of the components of a system of the present disclosure.

According to embodiments, FIG. 5 illustrates components of the system for establishing provenance and authenticity using a tracking technology, such as RFID, in combination with the virtual inventory system, which serves as a global provenance catalogue. According to embodiments, wine producers 501 are responsible for attaching RFID labels at the time of packaging and preparation of the wine either for further storage at the producer or shipping. According to embodiments, each RFID label has a globally unique electronic product code (EPC) that identifies each individual wine bottle and wine case. RFID labels are attached to each individual bottle by using, either (for the purpose of wine bottling) a traditional hollow capsule with an integrated RFID label 502, or for cheaper wine, an RFID label that is affixed to the wine bottle with an adhesive. An RFID label affixed via and adhesive is also attached to each case 503 containing individual wine bottles.

According to embodiments, provenance is maintained by installing an RFID label such that is cannot be removed without opening/unsealing the bottle. Thus counterfeiters cannot remove the RFID label and affix it to counterfeit bottles of wine, for example.

According to embodiments, the RFID label in the traditional capsule that goes over the top of the bottle is that an RFID label that becomes permanently disabled at the time the bottle is opened. By using an RFID label that will become permanently disabled upon opening, to bottle is guaranteed to be authentic. If the bottle previously was opened, the RFID label was destroyed in the process of opening the bottle, making it useless. If the wine is not likely to be counterfeited, an RFID affixed via an adhesive will suffice, according to embodiments.

Adding an RFID label to the case associates it with a unique EPC for the case and correlates it with, the EPCs of the bottle, within the case, according to embodiments. Thus, one may readily determine if a case truly contains the original wine bottles or if one or more of the bottles were exchanged with bottles from other cases, for example, those that might have a less that ideal provenance. For each case, wine producer 501 enters the initial case configurations into RFID terminal 504 that is connected to RFID antenna 517 and wide area network 7. RFID terminal 504 is a computer, according to embodiments, that provides wine producer 501 with an interface to update virtual inventory 8 with the EPC of each case and its corresponding bottles 503. RFID antenna 17 attached to RFID terminal 504 is used to ensure that the correct EPC is associated with each bottle and case. Globally unique EPCs are allocated in advance to each wine producer 501, but each wine producer 501 is responsible for creating the association between EPCs and wine bottles and wine cases 503. This data is then uploaded to virtual inventory 8.

According to embodiments, when the wine is loaded onto delivery trucks 508 by the wine producer, RFID antennas 17 register that the wine has been shipped. Participating wine distributors/wholesalers 18 have similar RFID terminals 504 and RFID antennas 17 connected to wide area network 7 that interfaces with virtual inventory 8. When RFID antenna 17 at a wine distributor/wholesaler 18 detects an RFID label on a bottle or a case, virtual inventory 8 is updated with a new location for the case and its accompanying bottles. According to embodiments, for each RFID label that is detected, virtual inventory 8 performs an exception analysis, warning the wine distributor/wholesaler of any discrepancies. For example, a detected wine bottle or case may have previously been reported as stolen by another participant (producer, distributor, wholesaler, retailer, auction house, collector, consumer, etc.), or a detected case may contain different contents than when shipped. Thus, according to embodiments, possession of the wine is tracked from cradle to grave.

When the wine is shipped from distributor/wholesaler 18, the procedure detecting the wine bottles and cases via RFID is performed and an exception analysis is repeated prior to shipment to wine retailers, auction houses 10, or collectors and consumers 19.

According to embodiments, the RFID system of the present disclosure may be installed with retailer/auction houses 510 or with consumers/collectors 19, as illustrated in FIG. 5.

According to embodiments, users may have RFID antennas 17 installed in their vine cellars 512. Because the antennas are connected to computer 4, which is connected via wide area network 7 to virtual inventory 8, the contents of consumer/collector's 19 wine cellar 512 is monitored.

Additionally, according to embodiments, RFID antenna 17 may comprise a series of antennas disposed throughout wine cellar 512. As wines are stored in wine cellar 512, computer 4 records the presence of the wine automatically. Moreover, computer 4 records the general location of each bottle of wine. According to embodiments, using the series of RFID antennas, the location of the wine in wine cellar 512 may be approximated to within a few feet of its actual location, allowing for easy retrieval of the wine, especially in larger wine cellars. According to embodiments, location of the wine may be approximated by determining the location of single RFID antenna among a series of RFID antennas having the strongest signal to the RFID on the wine bottle. Alternate embodiments use multiple RFID antennas to triangulate the relative location of the wine bottle. Thus, the need for manual organization systems of wine bottles is not needed because computer 4 can direct consumer/collector to a location by displaying the location on a schematic representation of the wine cellar on it's screen to get the consumer/collector to within a couple of feet of the actual bottle, according to embodiments. According to alternate embodiments, computer 4 controls a laser pointing device mounted on the ceiling of the wine cellar. According to still other embodiments, displaying the location occurs by activating a light, such as an LED, in the location of the wine bottle or causing an audio signal to emanate from the location. When the consumer/collector seeks a bottle of wine, the computer moves the laser point such that it points to the approximate location of the wine bottle. These principles are equally applicable to wine cellars in restaurants, auction houses and retail stores 510, distributor/wholesalers 18, and wine producers 501.

Figure 6:
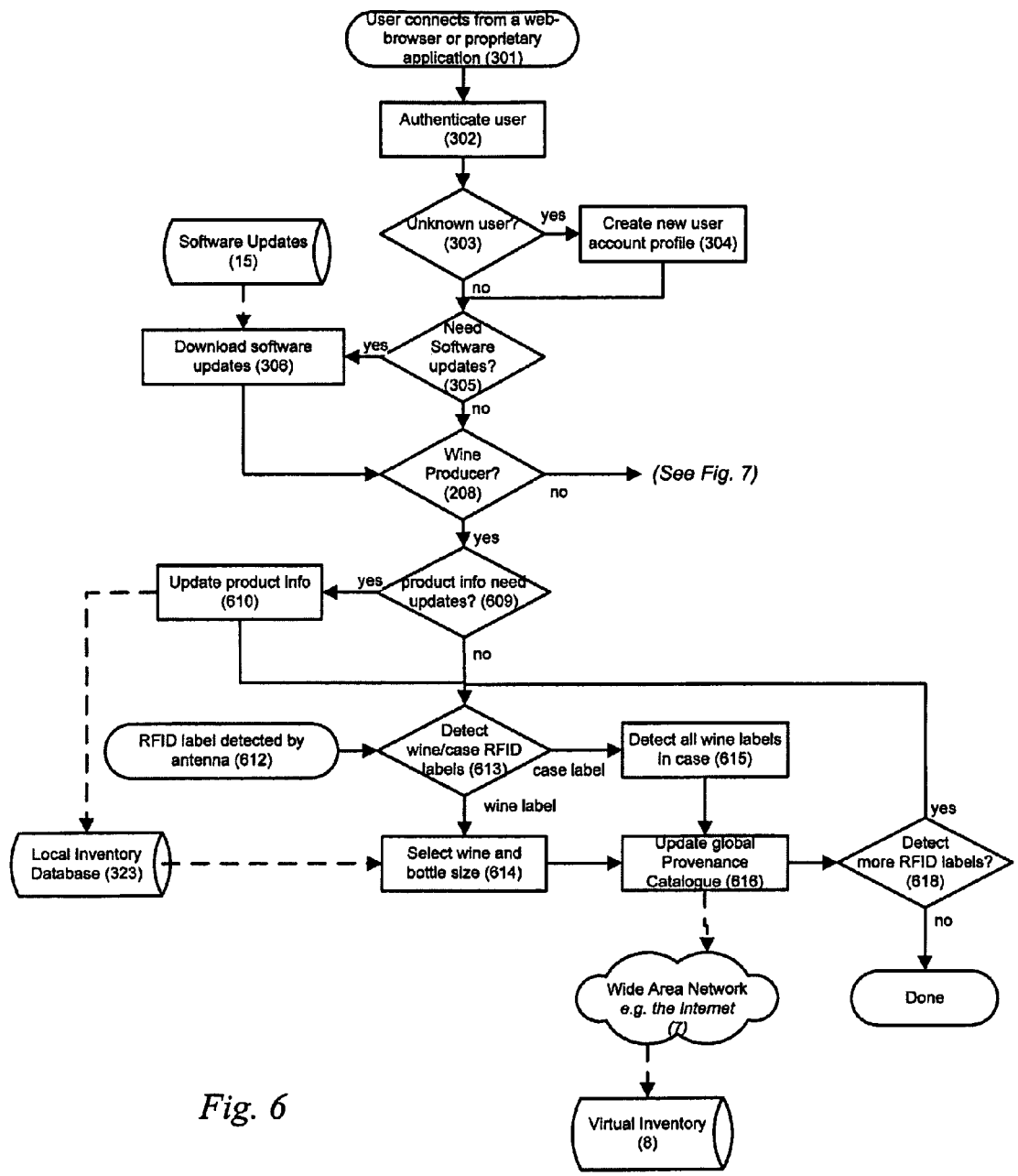
FIG. 6 is a flowchart of an embodiment of an initial entry of RFID data into a system of the present disclosure.

According to embodiments, FIG. 6 is a flowchart illustrating the initial entry of RFID data into the virtual inventory system. Wine producers connect to the RFID terminal system either from a web browser or a proprietary application 201. Authentication proceeds as described previously in operations 302, 303, 304 and software updates occur as previously described in operations 305 and 306.

According to embodiments, the system determines first whether the user is a wine producer in operation 208. If the user is not a wine producer, FIG. 7 details the options available to these users. In operation 609 wine producers choose to either update wine information already in local inventory database 323 or add new general wine classifications, for example define new vintages, bottle sizes, case capacity, templates for associating a wine to an EPC found on a detected RFID labels etc. All product information is stored in local inventory database 323 unique to the specific wine producer for quick and easy access by the RFID terminal system.

After any necessary updates or additional information is added to local inventory database 323 in operation 609, RFID terminal detects RFID labels on wine bottles and cases in operation 612 by moving the wine case through an area that is in range of an RFID antenna connected to an RFID terminal. For each detected RFID label, the system decides; based on the detected EPC, if it is a bottle or a case in operation 613.

According to embodiments, if a bottle is detected, the system asks the user for the wine, vintage, bottle size combination, and other useful information to associate with the bottle, such as a chain of custody. According to embodiments, the system may have predetermined information associated with the wine. If so, the system process each new EPC detected and associates it with the same wine information until the user changes the predetermined information or clears the predetermination status, allowing wine producers to easily associate EPC for many bottles.

According to embodiments, when a case EPC is detected, the system will ask the user for the number of wine bottles that is supposed to be stored in each case, if it has not previously been predetermined. If previously predetermined, the system assumes the same number of bottles per case as the previously detected case until the user changes the setting. Once the case size is determined, the system associates the detected case EPC along with all bottle EPCs in the case in operation 615. If it can't detect the bottle EPCs, it will warn the user. If all bottle EPCs are detected, the system updates virtual inventory 8 with each individual bottle EPCs and related information, as well as the association between the case EPC and all contained bottle EPCs in operation 616. This process is repeated as necessary in operation 618.

Figure 7:
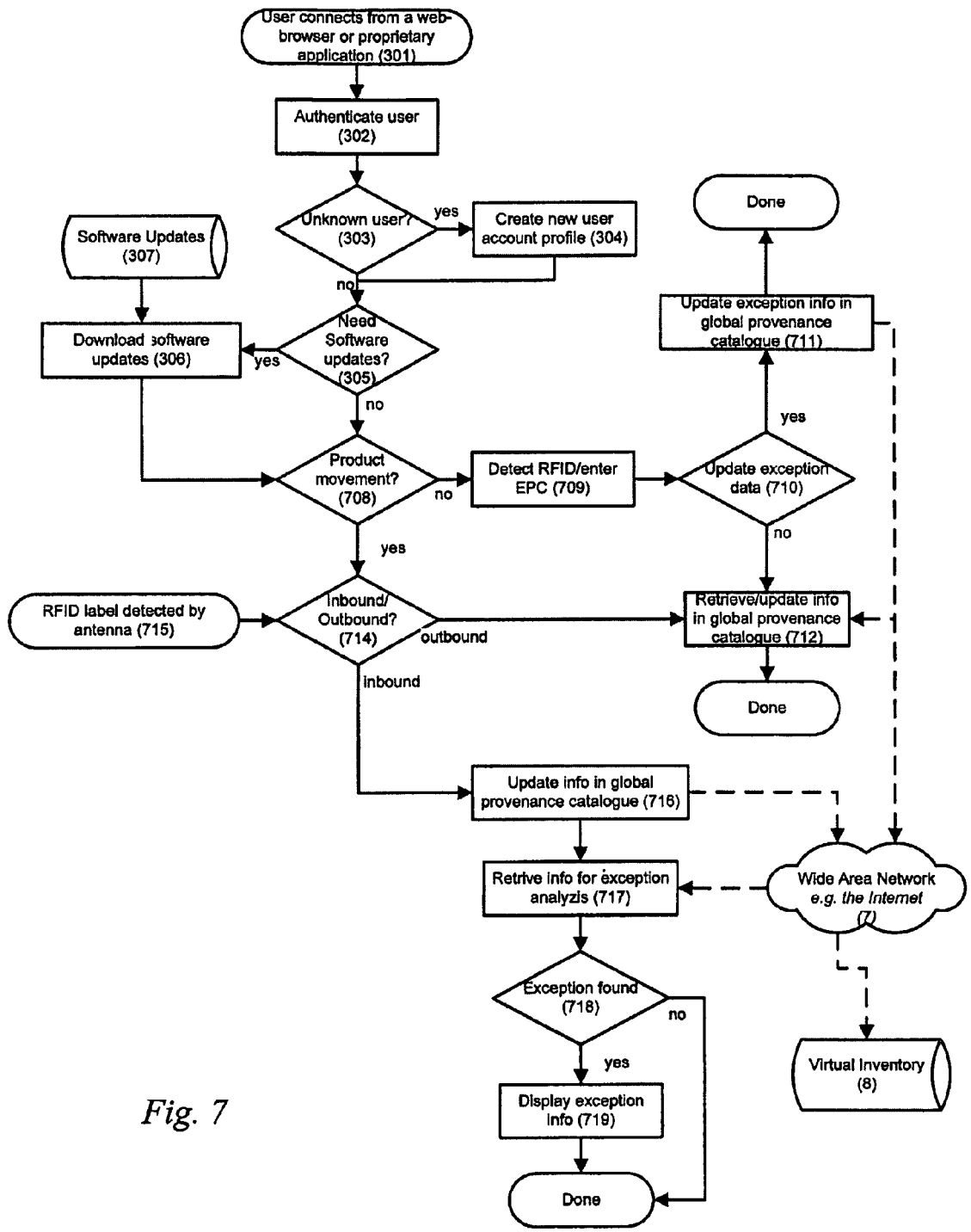
FIG. 7 is a flowchart of an embodiment for making consecutive updates and lookups of RFID data.

According to embodiments, FIG. 7 is a flowchart illustrating consecutive updates and lookups of RFID data after a wine or case is part of the virtual inventory system. Users of the virtual inventory system connect to an RFID terminal, such as computer 4, either from a web browser or a proprietary application 301. Authentication and software update occur as previously disclosed.

Depending on whether the RFID terminal will be used to automatically detect product movement or not in operation 708, various features are available. Users detect EPC information for an individual bottle or case in operation 709. After the EPC information is determined in operation 709, information regarding the existing provenance history of a wine may be determined in operation 712. Additionally, exception information may be updated in operation 711 regarding that wine or case. If the added exception info is for a missing/stolen bottle or case, the user can select the EPC from a list of wines or cases that the RFID terminal has previously registered to be stored at the user's location. Thus, without having the bottle or case with RFID or knowing the EPC, a user can report the bottle or case as missing.

If the system is used to automatically detect product movement in operation 715, it first decides if the movement is inbound or outbound in operation 714. The first time an EPC is detected, it is deemed as an inbound movement and the second time as outbound movement. For inbound movement, the virtual inventory system first updates virtual inventory 8 in operation 716, followed by an automatic exception analysis in operation 717. If an exception is found in operation 318, the virtual inventory system alerts the user in operation 319 about the exception. For example, exceptions could be that an inbound wine bottle or case has previously been reported as stolen by another participant or a detected case doesn't contain the original bottle configuration.

For outbound movement, virtual inventory system is updated with the departure of the wine/case 712. According to embodiments, users can identify when the outbound movement actually occurs, for example, if a bottle of wine is temporarily removed from the wine cellar for a time.

Figure 8:
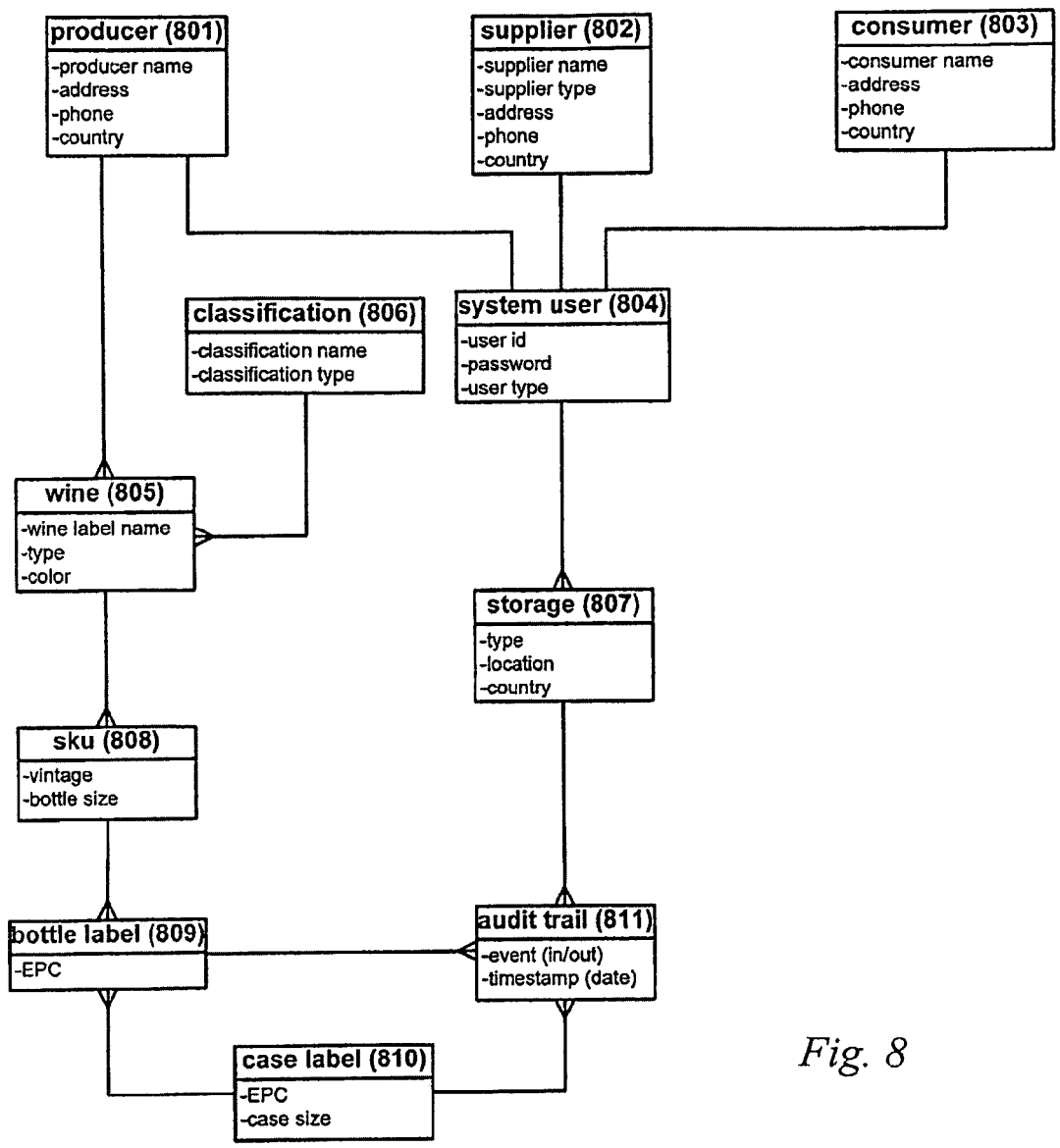
FIG. 8 is a block diagram of an embodiment of a data structure of an RFID-based global catalogue.

According to embodiments and as illustrated in FIG. 8, a relational data diagram of the virtual inventory system is disclosed. Accordingly, each of the necessary data structures and their relationships are shown that are needed to create the database structure for a global provenance catalogue, which, according to embodiments, is a component of virtual inventory 8. Data structures are either viewed as entities in a traditional entity-relationship diagram used to describe databases or as classes used when designing software algorithms and its data. The lines between data structures in the diagram illustrate ordered associations between data and can either be viewed as relationships in an entity-relationship diagram or as references between classes used when designing software. The significance of the end points of the lines are either one-to-one (single line end points) or one-to-many (forked line at one end point). One-to-one endpoints is that each entity/class in one end can only be associated with exactly one entity/class on the other end. One-to-many is defined as each entity/class in one end can be associated with one or more entities/classes on the forked end (e.g., each producer can produce many wines, but each wine can only be produced by exactly one producer). Each user of the system is described by system user data 804. Each system user is associated with one and only one data instance of a producer 801, a supplier 802, or a consumer 803 depending on the role the user has within the scope of the system.

Each of the roles producer 801, supplier 802, and consumer 803 can (from the system user data structure) be associated to one or many storage locations 807 used to capture the user's physical locations used for storing wine (e.g., producer's wine cellars, wine warehouses, or a consumer's wine collection). A producer is, in addition to a system user, also associated with the wine 805 that it produces. Each wine, is in addition to its producer, also associated with one classification 806 and a set of data 808. Because wine data may be the same for a plurality of bottles, for each data there will be as many EPCs 809 as there are physical bottles. Similarly, for each physical case used to store those bottles, there will be a case label 810 data structure.

The main purpose of the bottle and case label data is to capture information about the EPC, but they also act as a logical representation of the physical bottle/case that carries the label encoding the EPC in the global provenance catalogue portion of the virtual inventory system. Audit trail 811 correlates all the data and creates an auditable provenance trail, capturing all the significant events throughout each bottle's product cycle from tapping wine into it to consumption, with all the intermittent logistical events in between. Each bottle label will have many audit trail records that combines the bottle's EPC with its case EPC, identifies the storage location the bottle was either received at or shipped from, and also the date and time for each event. If a bottle passes out of the system by virtue of a person not participating in the system, it must first by authenticated prior to reentering the system on a subsequent sale to a person participating in the system. If a bottle is determined to be stolen, it will result in a new audit trail representing the theft. Also every time a case is captured in the audit trail as inbound, the RFID terminal will compare all the associated bottles for the inbound event with the original bottles initially associated with the case to detect if there has been any change to the content of the case.

A transparent or opaque plastic capsule with an integrated RFID label that is affixed over the bottle top by using heat to shrink-wrap it into a tight fit. A separate RFID label disc that is placed on top of the cork before the traditional capsule is placed over the bottle top. Any type of RFID label with adhesive that is attached anywhere on the wine bottle. This includes integrating the RFID label with the traditional wine label either on the front, back, or neck of the bottle.

The virtual inventory system could also be extended to interact with external systems for the purpose of wine procurement, wine logistics, wine compliance, wine insurance, wine cellar management, peer-to-peer wine trading, etc, according to embodiments.

According to embodiments, the methods and systems disclosed herein are implemented as a machine readable set of instructions for customers and distribution centers installed on a proprietary computer architecture built from standard components but optimized for running the system. According to embodiments, the proprietary computer system used by customers and distribution centers comprises an RFID antenna with a built-in wireless network interface; at least one LCD touch screen system having a built-in wireless network interface to present the user interface as well as receive user input; be connected to a wireless routing device for connectivity to the internet, as well as manage the wireless connections to the RFID antenna and the LCD touch screens.

According to embodiments, the virtual inventory system runs on a plurality of internet connected servers having storage capacity to hold: authorization databases 9, software updates 15, classification database 10, inventory database 11, order database 12, logistics database 13, and collaboration database 14.

The processes described above can be stored in a memory of a computer system as a set of instructions to be executed. In addition, the instructions to perform the processes described above could alternatively be stored on other forms of machine-readable media, including magnetic and optical disks. For example the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A system comprising:
 a plurality of items, each item being associated with a unique electronic product code for the life of each item;
 a plurality of electronic product code readers disposed in a plurality of disparate locations; and
 a virtual inventory to maintain inventory information of a plurality disparate collections of items connected to each of the plurality of electronic product code readers;
 wherein the virtual inventory maintains a record of the movement of each item between a plurality if disparate collections, whereby at least one of the authenticity of the item is confirmed or provenance of the item is tracked;
 wherein at least one electronic code reader monitors each disparate collection.

2. The system of claim 1, wherein the electronic code reader comprises an RFID reader and each electronic product code is associated with each item through the use of an RFID tag.

3. The system of claim 2, wherein the RFID tag affixed to each item must be rendered inoperable prior to use of the item.

4. The system of claim 1, wherein the item comprises at least bottles or cases of beverages.

5. The system of claim 1, wherein the location of each item may be determined.

6. The system of claim 5, wherein a provenance history is created, the provenance history comprising at least the location where each item resided.

7. The system of claim 5, wherein items determined to be missing from the location cause an alert to be communicated to an entity.

8. The system of claim 1, further comprising:
 an authentication database;
 a classification database configured to determine a standardized name for each item that is stored in the virtual inventory;
 an order database configured to receive an order for one or more items contained in at least one of the disparate collections and to maximize efficient fulfillment of the order based on at least one of cost of the item, number of items available for a seller of the items, and physical proximity of the seller and the purchaser; and a logistics database configured to track fulfillment of the order.

9. A method comprising:

offering a virtual inventory to maintain inventory information of a plurality disparate collections of items;

connecting the virtual inventory to at least one electronic product code reader that monitors the inventory of one of the disparate collections of items, each item having a unique electronic product code implement affixed for the life of the item; and maintaining information regarding the inventory of the disparate collection of items, wherein the virtual inventory periodically collects inventory data from each electronic product code reader to which it is connected;

wherein the virtual inventory maintains a record of the movement of each item between a plurality if disparate collections, whereby at least one of the authenticity of the item is confirmed or provenance of the item is tracked;

wherein the electronic product code implement is rendered inoperable when each item is used.

10. The method of claim 9, wherein the electronic product code reader comprises an RFID reader; and wherein an RFID tag comprises each electronic code implement.

11. The method of claim 9, wherein the electronic product code implement is installed at a point of origin of the item.

12. The method of claim 9, wherein the electronic product code implement is installed after verifying at least the authenticity of the item.

13. The method of claim 12, wherein the electronic produce code implement is rendered inoperative upon use of the item.

14. The method of claim 9, further comprising communicating an alert when an item that should be in an inventory is missing from the inventory for a predetermined time period.

15. The method of claim 9, wherein the virtual inventory further comprises:

an authentication database;

a classification database configured to determine a standardized name for each item that is stored in the virtual inventory;

an order database configured to receive an order for one or more items contained in at least one of the disparate collections and to maximize efficient fulfillment of the order based on at least one of cost of the item, number of items available for a seller of the items, and physical proximity of the seller and the purchaser; and a logistics database configured to track fulfillment of the order.

16. A machine readable medium having instructions stored thereon for performing the steps comprising:

offering a virtual inventory to maintain inventory information of a plurality disparate collections of items;

connecting the virtual inventory to at least one electronic product code reader that monitors the inventory of a disparate collection of items, each item having a unique electronic product code implement affixed for the life of the item; and maintaining information regarding the inventory of the disparate collection of items, wherein the virtual inventory periodically collects inventory data from each electronic product code reader to which it is connected;

wherein the virtual inventory maintains a record of the movement of each item between a plurality if disparate collections, whereby at least one of the authenticity of the item is confirmed or provenance of the item is tracked;

wherein the electronic product code implement is rendered inoperable when each item is used.

17. The machine readable medium of claim 16, wherein the electronic product code reader comprises an RFID reader; and wherein an RFID tag comprises each electronic code implement.

18. The machine readable medium of claim 16, further comprising communicating an alert when an item that should be in an inventory is missing from the inventory for a predetermined time period.

19. The machine readable medium of claim 16, wherein the virtual inventory further comprises:

an authentication database;

a classification database configured to determine a standardized name for each item that is stored in the virtual inventory;

an order database configured to receive an order for one or more items contained in at least one of the disparate collections and to maximize efficient fulfillment of the order based on at least one of cost of the item, number of items available for a seller of the items, and physical proximity of the seller and the purchaser; and a logistics database configured to track fulfillment of the order.

* * * * *